US012716813B2

(12) United States Patent
Campagna et al.

(10) Patent No.: US 12,716,813 B2
(45) Date of Patent: Aug. 25, 2026

(54) ENGINE OIL CONSUMPTION DETECTION USING OIL LEVEL AND MACHINE TILT

(71) Applicant: Caterpillar Inc., Peoria, IL (US)

(72) Inventors: Michael J. Campagna, Chillicothe, IL (US); Jon S. Okenfuss, Carmel, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/830,918

(22) Filed: Sep. 11, 2024

(65) Prior Publication Data

US 2026/0071934 A1 Mar. 12, 2026

(51) Int. Cl.

*B60Q 1/00* (2006.01)
*G01M 15/05* (2006.01)
*G06Q 10/20* (2023.01)

(52) U.S. Cl.

CPC ............ *G01M 15/05* (2013.01); *G06Q 10/20* (2013.01)

(58) Field of Classification Search

CPC .... G01M 15/05; G01M 15/042; G06Q 10/20; F01M 11/12; F01M 2011/1426; F01M 2011/1446; F01M 2011/1473; G01F 23/263

USPC ................ 340/450.3, 612, 450, 450.1, 450.2

See application file for complete search history.

(56) References Cited

U.S. PATENT DOCUMENTS 5,057,813 A 10/1991 Sasaki et al.
5,072,615 A * 12/1991 Nawrocki ............ G01F 23/804 33/366.14
5,687,687 A 11/1997 Trueblood et al.
5,907,278 A * 5/1999 Park ......................... G01C 9/20 33/366.19
7,449,995 B1 * 11/2008 Clanton-Holloway ...................... G07C 5/006 340/439
7,498,932 B1 3/2009 Steffen
7,690,246 B1 4/2010 Discenzo
10,724,408 B2 * 7/2020 England .................. C11D 7/24

(Continued)

FOREIGN PATENT DOCUMENTS

CN 112525293 A 10/1991
DE 10062551 A1 6/2002

(Continued)

OTHER PUBLICATIONS

Written Opinion and International Search Report for Int'l. Patent Appln. No. PCT/US2025/042163, mailed Dec. 5, 2025 (12 pgs).

*Primary Examiner* — Anh V La

(57) ABSTRACT

A system for detecting oil consumption includes an internal combustion engine, an oil container configured to receive oil, oil in the oil container having an oil level, an oil level sensor configured to output a signal indicative of the oil level, and a tilt sensor configured to output a signal indicative of an inclination of the oil container. The system further includes a controller configured to receive the signal indicative of the oil level from the oil level sensor, receive the signal indicative of the inclination of the oil container from the tilt sensor, determine an oil consumption rate of the internal combustion engine based on the signal from the oil level sensor and based on the signal from the tilt sensor, and determine a service interval for the internal combustion engine according to the oil consumption rate.

20 Claims, 5 Drawing Sheets

(56) References Cited

U.S. PATENT DOCUMENTS

| | | | | |
|---|---|---|---|---|
| 11,614,354 | B2 | 3/2023 | Swenson | |
| 11,788,446 | B1 | 10/2023 | Lake et al. | |
| 2011/0010070 | A1 * | 1/2011 | Bohr | G01F 23/804 73/1.73 |
| 2013/0080022 | A1 | 3/2013 | Mc Donald | |
| 2020/0355134 | A1 * | 11/2020 | Kelly | F02D 41/0085 |
| 2023/0288242 | A1 * | 9/2023 | Richart | G01F 15/005 |
| 2025/0137883 | A1 * | 5/2025 | Nair | F01M 11/12 |

FOREIGN PATENT DOCUMENTS

| | | | |
|---|---|---|---|
| DE | 202013012564 | U1 | 6/2017 |
| EP | 0515326 | A1 | 11/1992 |
| EP | 2112480 | A1 | 10/2009 |
| FR | 2907212 | B1 | 12/2008 |
| KR | 20030064197 | A | 7/2003 |
| KR | 20180055176 | A | 5/2018 |

* cited by examiner

ENGINE OIL CONSUMPTION DETECTION USING OIL LEVEL AND MACHINE TILT

TECHNICAL FIELD

The present disclosure relates generally to internal combustion engines, and more particularly, to a system for detecting engine oil consumption.

BACKGROUND

Internal combustion engines are used in various types of machines, including vehicles, to generate electrical power, provide power for propulsion, and operate implements. Internal combustion engines for industrial machines, in particular, operate for long periods of time in challenging environments. Routine maintenance and overhauls are scheduled in advance to facilitate longevity of the engine. While predetermined maintenance and overhaul intervals are helpful to ensure necessary work is performed, these intervals do not account for variations caused by operating conditions (e.g., dust, oil quality, environmental temperature, etc.), differences in individual components, and other factors that impact engine wear. In some systems, sensors are used to determine or adjust maintenance intervals. Existing systems are not, however, configured to utilize oil level measurements and, if desired, machine tilt measurements to improve the accuracy at which maintenance and/or overhaul intervals are set or adjusted.

A vehicle liquid monitoring system is described in U.S. Pat. No. 11,788,446 (the '446 patent) to Lake. The liquid monitoring system is in the form of a dipstick and includes a sensor. The sensor detects fluid level so a controller can compare the fluid level to a threshold level. The system in the '446 patent may be helpful for detecting fluid levels, but is unable to determine or adjust maintenance or overhaul timings.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In an aspect, a system for detecting oil consumption may include an internal combustion engine, an oil container configured to receive oil, oil in the oil container having an oil level, an oil level sensor configured to output a signal indicative of the oil level, and a tilt sensor configured to output a signal indicative of an inclination of the oil container. The system may further include a controller configured to receive the signal indicative of the oil level from the oil level sensor, receive the signal indicative of the inclination of the oil container from the tilt sensor, determine an oil consumption rate of the internal combustion engine based on the signal from the oil level sensor and based on the signal from the tilt sensor, and determine a service interval for the internal combustion engine according to the oil consumption rate.

In another aspect, a system for detecting engine oil consumption may include an internal combustion engine, an oil container configured to receive oil, the oil having an oil level, an oil level sensor configured to output a signal indicative of the oil level, and a controller. The controller may be configured to receive the signal indicative of the oil level from the oil level sensor, determine an oil consumption rate based on the signal from the oil level sensor, determine a service interval for the internal combustion engine, and adjust the service interval based on the oil consumption rate.

In yet another aspect, a method for detecting engine oil consumption may include receiving a signal indicative of an oil level from an oil level sensor, the oil level sensor being connected to an oil container for storing oil for an internal combustion engine, receiving a signal indicative of an inclination of the oil container from a tilt sensor, determining a service interval for the internal combustion engine, and adjusting the service interval based on the signal from the oil level sensor and based on the signal from the tilt sensor.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value. As used herein, the phrase "based on" encompasses the phrases "based in part on" and "based entirely on."

Figure 1:
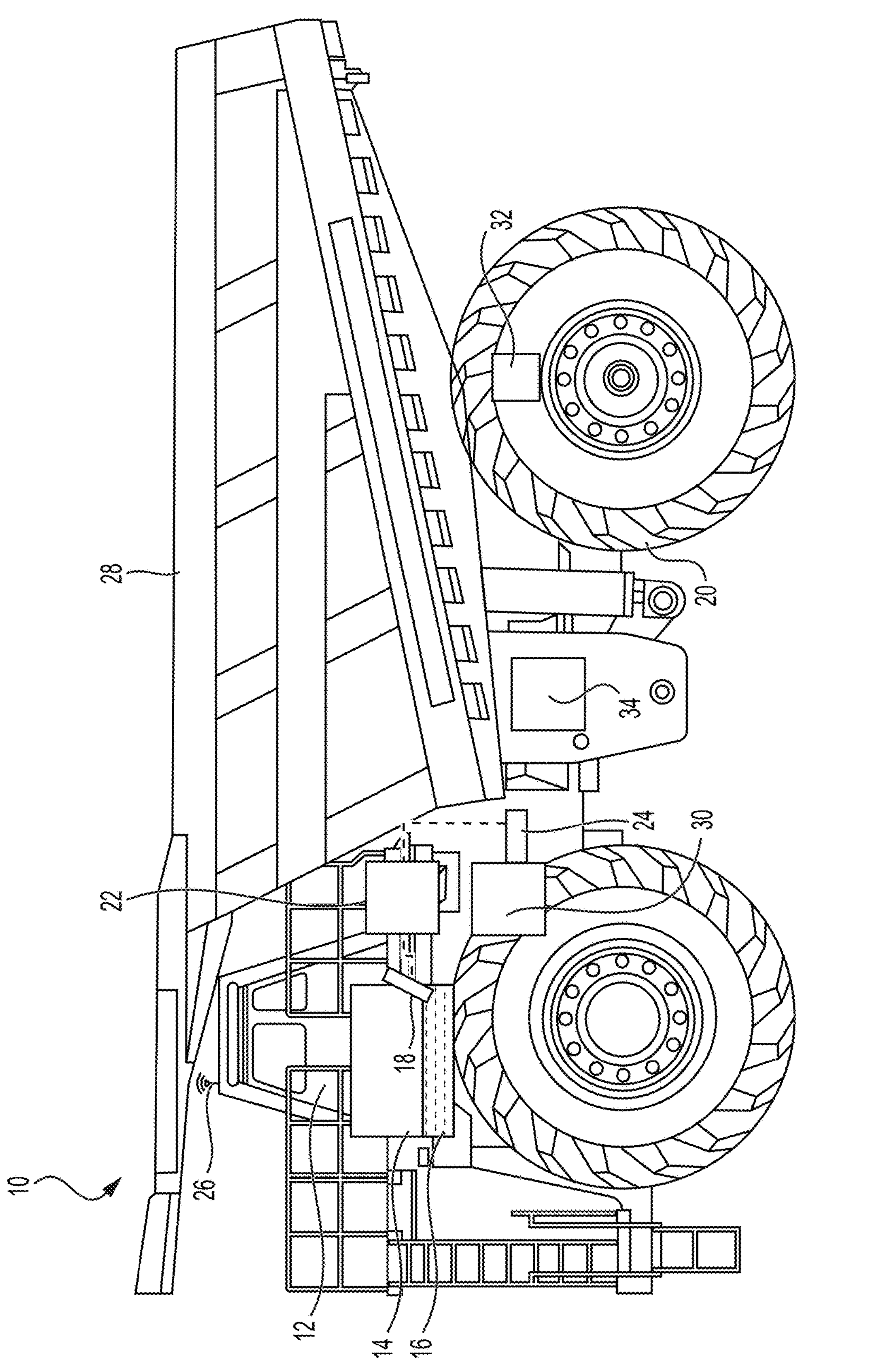
FIG. 1 is a partially-schematic diagram of a machine with an oil consumption detection system, according to aspects of the disclosure.

FIG. 1 is a partially-schematic diagram illustrating an industrial machine 12 and an oil consumption detection system 10. Oil consumption detection system 10 may include components for detecting and monitoring a rate at which lubricating fluid, such as oil, is consumed by an internal combustion engine 30 supported on machine 12, or other components of machine 12. Oil consumption detection system 10 may include a level sensor 18, a tilt sensor 24, and an oil consumption module (OCM) 22. In some configurations, oil consumption detection system 10 may include one or more of: an oil container 14 of machine 12, a data transmission device 26, a suspension sensor 32 (an additional example of a tilt sensor), or a force sensor 34 (an additional example of a tilt sensor).

Machine 12 may be an industrial machine such as a mining machine (e.g., a surface haul truck as shown in FIG. 1, an underground haul truck, a loader, etc.), an earthmoving machine, a pipelayer, a stationary machine (e.g., a genset), hybrid-powered systems (e.g., including an internal combustion engine and a battery, fuel cell, etc.), hydraulic pumps (e.g., for hydraulic fracturing), or any other suitable machine or system including an internal combustion engine 30 or other power-generating device that consumes fluid over an extended period of time. When machine 12 is a mobile industrial machine, machine 12 may include propulsion devices 20 (e.g., wheel or tracks). Mobile machines 12 may include one or more implements, a bed 28 as shown in FIG. 1, or other devices that allow machine 12 to perform work.

Internal combustion engine 30 may combust fuel to generate power to propel machine 12 and/or to generate electrical energy. Internal combustion engine 30 may be lubricated with oil 16, oil 16 being stored within an oil container 14 (e.g., an oil sump). In some aspects, oil container 14 may include an opening sized to receive an oil dipstick, with level sensor 18 extending through the opening and into oil container 14 to monitor the level of oil 16, as described below.

Data transmission device 26 of system 10 may include one or more network communication devices that transmit and, if desired, receive, data from one or more systems that are off-board (e.g., remote from) machine 12. For example, while OCM 22 is shown on-board machine 12 and at the same location as machine 12, OCM 22 may be located at a different location than the location of machine 12 and off-board of machine 12. Data transmission device 26 may enable communication with an OCM 22 that is at a remote location and operable to supervise machine 12. In some examples, an off-board and off-machine OCM 22 may be in communication with a plurality of machines 12 to monitor oil consumption of multiple industrial machines 12 simultaneously.

Level sensor 18 is configured to detect the level, or height, of oil 16 within oil container 14. Level sensor 18 may be configured to output a level signal based on a capacitance measurement. Level sensor 18 may be a single sensor that is configured to detect small changes in fluid levels. In other configurations, a plurality of sensors may together form level sensor 18, the multiple level sensors being configured to measure different levels of oil 16 (e.g., as a series of discrete oil levels). As described herein, an "oil level" may correspond to the height of oil within a container. The oil level may be contained within a plane defined by the top surface of the oil. The plane containing the oil level may be generally horizontal when machine 12 is on level ground, and inclined when machine 12 is at an incline.

Level sensor 18 may be shaped for connection with a dipstick opening or similar structure of oil container 14. Level sensor 18 may extend at an angle toward the bottom of oil container 14, as represented in FIG. 1, or may extend along a substantially vertical direction.

Tilt sensor 24 may be configured to output a signal that indicates the orientation of machine 12, including the inclination ("tilt") of oil container 14 and of internal combustion engine 30. Tilt sensor 24 may be connected to the chassis of machine 12, to the frame of machine 12, to oil container 14, or at another location. Tilt sensor 24 may be a single-axis level sensor, a two-axis level sensor, a three-axis level sensor, an inclinometer, or an inertial measurement unit (IMU). If desired, multiple tilt sensors 24 may be used, to provide redundancy or to measure different types of tilt (e.g., different tilt axes).

As indicated above, suspension sensor 32 is another example of a "tilt sensor." Suspension sensor 32 may, instead of directly detecting inclination, output a signal that indicates a condition of machine 12 that is associated with inclination. For example, suspension sensor 32 may detect suspension travel and/or position of a suspension device. In the example of a two-axle machine 12, four suspension sensors 32 may be present, each adjacent to a respective propulsion device 20. Differences in suspension travel and/or position of suspension components may indicate the tilt of oil container 14 (e.g., when frontward sensors 32 indicate different travel as compared to rear-ward sensors 32).

A force sensor 34 is another example of a "tilt sensor." Force sensor 34 my include one or more load cells placed on oil container 14 or other locations of machine 12, such as the locations described above with respect to suspension sensor 32. Load cells or other forms of force sensors 34 may output a signal indicative of force at one or more locations of machine 12, when machine 12 is stationary and when machine 12 is in motion. Differences in detected force at different locations of machine 12 may indicate tilt. For example, load cells or other force sensors 34 may be located proximate respective wheels of machine 12 to identify load distributions that are indicative of tilt.

OCM 22 may be configured to receive signals from each of the above tilt sensors, including tilt sensor 24, suspension sensor 32, and force sensor 34. In some configurations, OCM 22 is located on machine 12 and is configured to monitor engine oil consumption as machine 12 operates over time. In examples where OCM 22 is located off-board of machine 12, sensors 24 may communicate with OCM 22 via data transmission device 26, and/or via one or more intermediate computing systems or control modules (e.g., via an electronic control module (ECM)) of machine 12. In configurations where OCM 22 is located on machine 12, OCM 22 may be in communication with the ECM for machine 12, partially integrated within the ECM, or entirely integrated within the ECM.

OCM 22 may encompass a single control module, or controller. As used herein, a "controller" encompasses both single controllers or control modules, or a plurality of controllers or control modules. OCM 22 may embody a single processor or multiple processors that receive inputs, such as oil level data and tilt data, and generate outputs, such as oil consumption rate indicators and service indicators. OCM 22 may include a memory, a secondary storage device, a processor such as a central processing unit, or any other means for accomplishing a task consistent with the present disclosure, as described below. The memory or secondary storage device associated with OCM 22 may store data and software to allow OCM 22 to perform its functions, including the functions described with respect to method 700, described below. Numerous commercially available microprocessors can be configured to perform the functions of OCM 22. Various other known circuits may be associated with OCM 22, including current monitoring circuitry, signal-conditioning circuitry, communication circuitry, and other appropriate circuitry.

Figure 2:
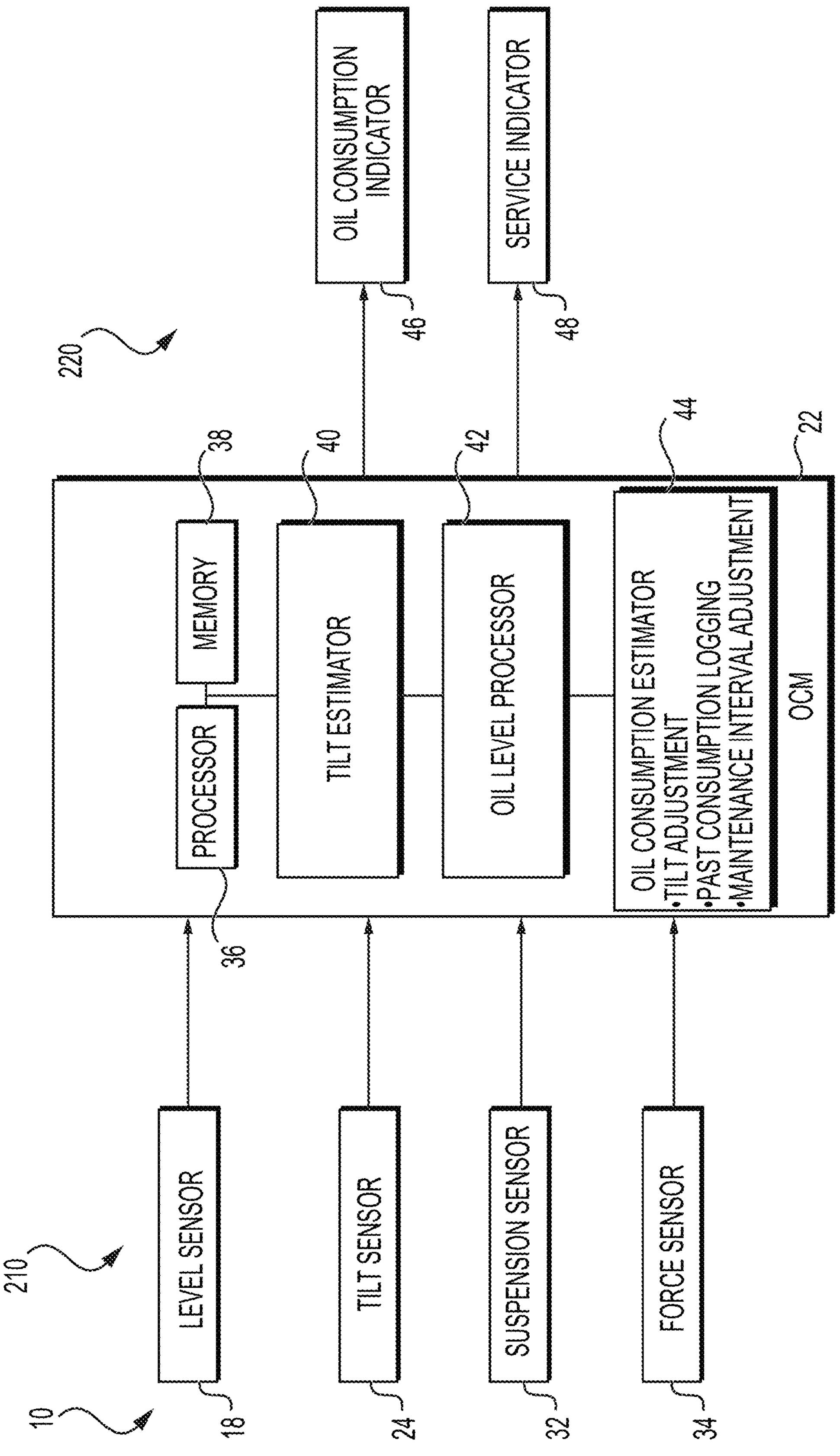
FIG. 2 is a block diagram of the oil consumption detection system of FIG. 1.

FIG. 2 is a block diagram illustrating an exemplary configuration of OCM 22. As shown in FIG. 2 and described above, OCM 22 may include one or more processors 36 and memory 38. The one or more processors 36 and memory 38 may be operable to implement a tilt estimator 40, an oil level processor 42, and an oil consumption estimator 44 of OCM 22. One or more of the modules of OCM 22, tilt estimator 40, oil level processor 42, and oil consumption estimator 44, may receive inputs 210 and generate outputs 220.

Inputs 210 may be generated via level sensor 18 and a tilt sensor, including at least one of tilt sensor 24, suspension sensor 32, or force sensor 34. Inputs 210 may be received, logged, filtered, and processed via one or more of tilt estimator 40, oil level processor 42, or oil consumption estimator 44. In configurations where tilt data is not used to adjust oil level data, sensors 24, 32, and 34 may be omitted.

Tilt estimator 40 may be configured to receive inputs from the tilt sensors associated with oil container 14. For example, tilt estimator 40 may receive tilt data from tilt sensor 24, the tilt data indicating an inclination of oil container 14 or of machine 12 as an entirety, in one, two, or three dimensions. In particular, tilt estimator 40 may be configured to identify pitch, roll, and yaw rotation of oil container 14 in both direction and magnitude. Tilt estimator 40 may be configured to receive tilt data on a continuous or intermittent (e.g., periodic) basis and output tilt direction and tilt quantity data to oil consumption estimator 44. In configurations where suspension sensors 32 and/or force sensors 34 are present, tilt estimator 40 may be configured to convert suspension data or force data into estimated tilt of oil container 14 and of machine 12.

Oil level processor 42 may be configured to receive oil level data from level sensor 18 on a continuous basis or on an intermittent (e.g., periodic) basis. When data from level sensor 18 is generated on a continuous basis, oil level data may be sampled and logged via oil level processor 42. The oil level data received by oil level processor 42 may include oil level measurements that, due to the inclination or tilt of oil container 14, have a value that is higher or lower than the actual quantity of oil 16 in oil container 14 would indicate were machine 12 to be stationary and on level terrain. The oil level data may be output by oil level processor 42 for oil consumption estimator 44 for further analysis, as described below.

Oil consumption estimator 44 may receive tilt data and oil level data from tilt estimator 40 and oil level processor 42, respectively, and described above. Oil consumption estimator 44 may be configured to determine oil consumption of internal combustion engine 30 over time based on oil level data from level sensor 18. Oil consumption estimates may be created with oil consumption estimator 44 based on oil level data alone, or based on oil level data that is adjusted by use of tilt data from one or more of sensors 24, 32, or 34.

Oil consumption estimator 44 may be configured to perform various functions for estimating, adjusting, and logging oil consumption, as well as for adjusting service intervals. Estimation function of oil consumption estimator 44 may be made based on oil level data. The volume of oil in oil container 14 may be estimated based on oil level data points in combination with known internal geometry of oil container 14, such that each oil level data point may be correlated with a particular oil volume (e.g., via a look-up table).

Oil consumption estimator 44 may be configured to adjust one or more types of values that are useful for estimating oil consumption. These adjustments may be made based on individual data points or groups of data points that are generated with tilt data that was received as an input 210. Individual adjustments may be made by ignoring or changing the value of a data point (e.g., an individual measurement or measurement generated via a moving average or other computation) on an individual basis. Group adjustments may be made by adjusting or ignoring a group of data points generated over a period of time (e.g., over multiple hours or multiple days of operation of machine 12). While adjustments to oil level data may indirectly adjust oil consumption estimate values, in some embodiments, adjustments may be made to oil consumption estimates directly.

Oil consumption estimates may be tracked over time, for example as a series of discrete numerical values. These numerical values or other representations of past oil consumption is logged. Based on the oil consumption logs, oil consumption estimator 44 may determine a current oil consumption rate and determine a rate at which oil consumption is increasing. Oil consumption estimator 44 may be configured to determine when the oil consumption rate reaches a warning level or is above or below an expected consumption rate.

Oil consumption estimator 44 may be configured to generate, as an output 220, an oil consumption indicator 46 for one or for a plurality of machines monitored with oil consumption estimator 44. This oil consumption indicator 46 may indicate a current or recent oil consumption rate. This rate may be represented as a numerical value (e.g., in the form of liters per a set number of hours of operation or pounds per horsepower-hour). In other examples, the rate may be represented as a relative value (e.g., current oil consumption rate is 20% higher than expected), as a color, etc. Oil consumption indicator 46 may also indicate when the oil consumption rate exceeds a predetermined threshold value, such as a predetermined consumption rate or a consumption rate that exceeds an expected consumption rate by a predetermined amount. This indication may be in the form of a warning displayed to an operator, supervisor, fleet manager, etc. When a plurality of different machines 12 are monitored with OCM 22 (e.g., via an OCM 22 at a different location than machines 12), the indication may identify the location and identity of the particular machine 12.

Service indicator 48 may indicate when a service interval (e.g., routine maintenance, unscheduled maintenance, repair, engine overhaul, etc.) is due or when the service interval is expected to be due. For example, service indicator 48 may indicate when one or more of these types of services are due, or imminently due, based on current or previous oil consumption estimates. Service indicator 48 may indicate an estimated amount of time, for example in the form of operating hours, until routine maintenance, unscheduled maintenance, repair, or overhaul should be performed. Service indicator 48 may, in the example of an overhaul indication such as an overhaul interval (e.g., an amount of time, amount of operation, etc., until an overhaul should be performed), increase or decrease an estimated time for performing an engine overhaul based on multiple engine oil consumption values that are generated and analyzed. These engine oil consumption values for adjusting an overhaul indication may have been adjusted based on the above-described level data.

INDUSTRIAL APPLICABILITY

The systems and methods disclosed herein may be applied to any machine which consumes a fluid, such as engine oil, over a period of time and especially a prolonged period of time. In particular, the systems and methods disclosed herein may be useful for determining a service indicator, e.g., for an overhaul of an internal combustion engine, the service indicator being adjusted based on changes in oil consumption rates over time. Internal combustion engines useful with these systems and methods may be used in mobile machines, including mobile machines for mining, earthmoving, a pipe-layer, stationary machines, and others.

Figures 3, 4:
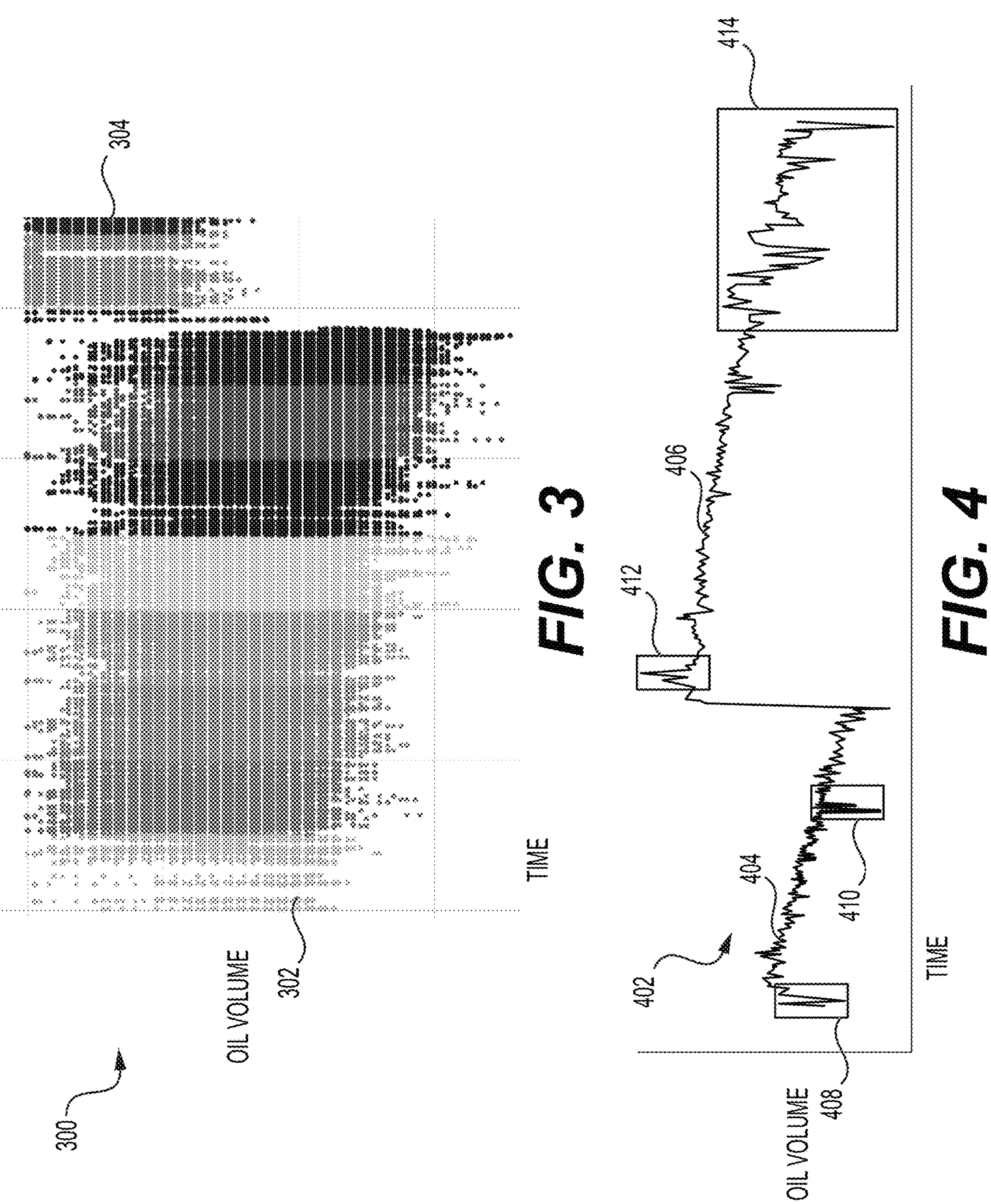
FIG. 3 is a chart representing oil volume data detected with a level sensor of an oil consumption detection system.
FIG. 4 is a chart representing processed oil volume data over a period of time.
Figures 5, 6:
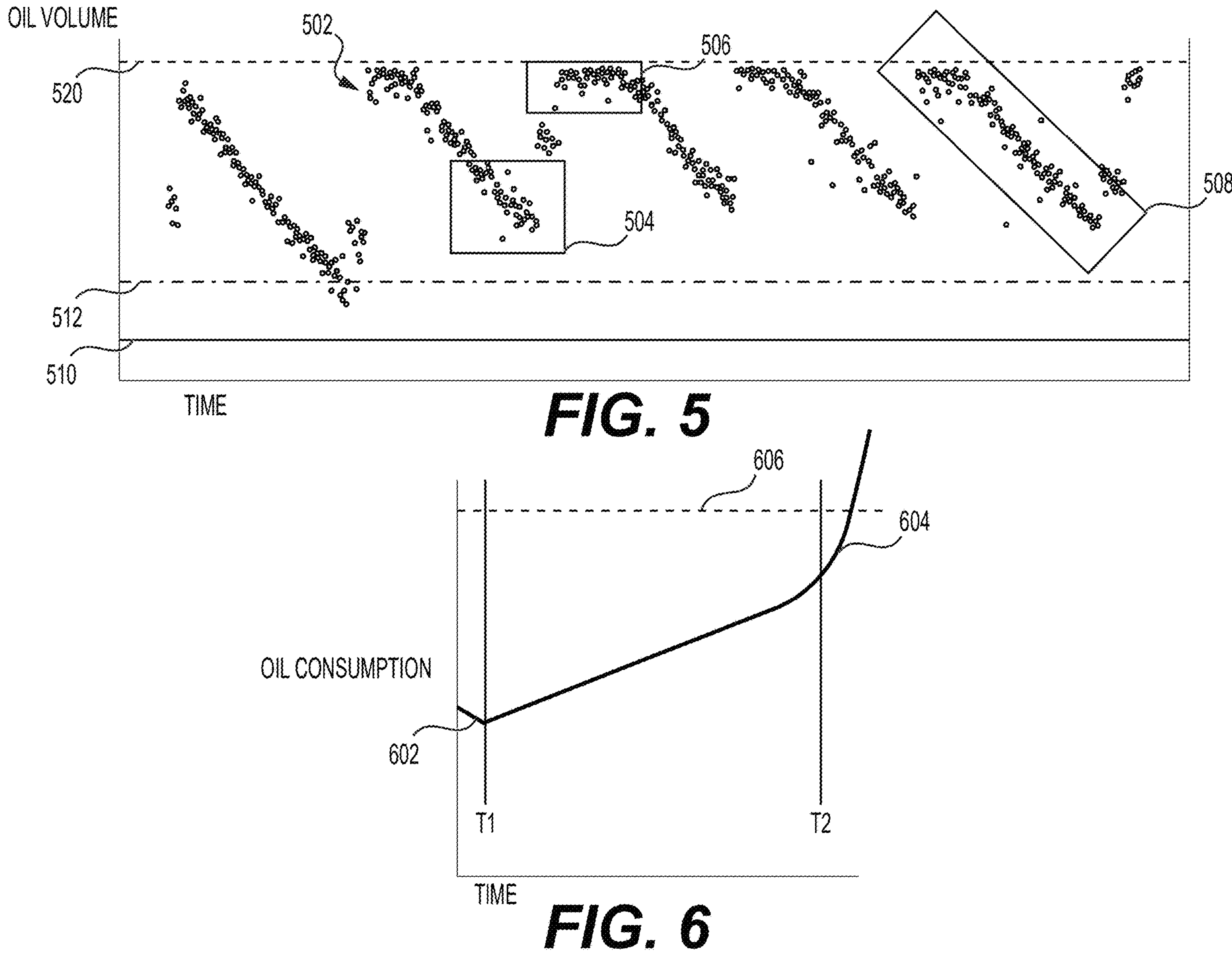
FIG. 5 is a chart representing processed oil volume data over another period of time.
FIG. 6 is a chart illustrating determined oil consumption values.

FIGS. 3-6 represent operations that may be made with OCM 22. The values in FIGS. 3-5 correspond to oil level measurements or oil volume measurements. Oil volume measurements represent the volume of oil 16 within container 14, and are derived based on detected oil levels and the volume of oil within container 14 for a given oil level, as described above. As oil volume is derivable from oil level, the two terms are used interchangeably in the discussion below. The values in FIG. 3-5 represent oil volume data that has not been adjusted based on tilt data. FIG. 6 represents oil consumption data that has been adjusted according to tilt data. Adjustments may be made at one or more stages of an oil consumption analysis, as described below.

Adjustments to the oil level data (e.g., the data represented in FIGS. 3-5), may be made with oil consumption estimator 44. Tilt adjustments may be made to individual tilt level data points, or to tilt level data that has been consolidated (e.g., via a moving average calculation). If desired, tilt adjustments may be made to oil consumption estimate values, instead of or in addition to adjustments to tilt level data.

In some aspects, an adjustment may be triggered when inclination, or tilt, of oil container 14 is determined to exceed a predetermined adjustment threshold value. The adjustment threshold value for triggering an adjustment may be associated with inclination with respect to a particular axis (i.e., whether the inclination corresponds to pitch, yaw, or roll). When tilt is measured with respect to multiple axes, different adjustment threshold values may be used for respective axes of tilt.

In some configurations, one or more points of oil level data are discarded or ignored with oil consumption estimator 44. The action of discarding or ignoring oil level data may be triggered based upon an amount of tilt (e.g., when an amount of tilt exceeds a data admission threshold data that is greater than the tilt threshold value). If desired, oil consumption estimator 44 adjusts oil level data when the tilt of machine 12 is greater than a first threshold value and discards oil level data when the tilt of machine 12 is greater than a second threshold value, the second threshold value representing more tilt than the first threshold value. As used herein, data is "discarded or ignored" when the data is not used in determining oil consumption estimation. The term "discard" does not require that the data be deleted or otherwise removed from memory.

FIG. 3 is a chart illustrating example oil volume data 300, including downward-trending data 302 and raised level data 304. Each point of volume data 300 in FIG. 3 may correspond to a data point measured with level sensor 18, also referred to as "raw" oil level data, raw oil level data having not been adjusted based on tilt. Vertical overlap of data points in downward-trending data 302 and raised level data 304 occur as level sensor 18 allows oil level processor 42 to log data points over a relatively long period of time. In FIG. 3, downward-trending data 302 represents level data as oil is gradually lost over time (e.g., due to oil slowly burning, leaking, etc.). The rapid increase between downward-trending data 302 and raised level data 304 represents an oil fill event in which oil 16 is added to oil container 14. In the examples described herein, no oil is added in regions containing downward-trending data.

If desired, oil consumption estimator 44 is configured to adjust raw oil level data, such that one or more data points of downward-trending data 302 and raised level data 304 are adjusted. These adjustments may be performed as described below, according to amount of tilt of machine 12. For example, adjustment may be performed when tilt is at least a predetermined minimum amount, as represented by a threshold value. Additionally or alternatively, the amount of adjustment may be based on the amount of tilt (e.g., an amount of an upward or downward adjustment is increased when the amount of tilt increases).

FIG. 4 illustrates oil level data that has been processed (e.g., filtered). As an example, the processed oil level data may have been subject to a low-pass filter, high-pass filter, or band-pass filter to remove outlying data. The oil level data may be correlated with corresponding (e.g., concurrent) engine conditions, such as oil level data generated when engine 30 was in a cold-start condition. This cold-start data may be discarded or ignored.

The processed oil level data represented in FIG. 4 may be generated with a moving average calculation, instead of or in addition to filtering and analysis based on concurrent engine conditions. Any appropriate moving average interval may be used, and may depend on the characteristics of engine 30 (e.g., a volumetric capacity of oil container 14). As examples, moving averages may be taken to merge data points across 1 hour or less, 5 hours, 10 hours, 20 hours, 24 hours, 36 hours or more, into a single data oil level point. In configurations where oil volume data 300 is not adjusted and is instead in the form of raw oil level data, moving averages or other processing may be performed on this raw oil level data. However, processing such as data transformation based on moving averages may be performed on data that includes one or more data points that were adjusted according to corresponding tilt data, as described herein.

While oil volume data 402 may be adjusted based on tilt data from tilt estimator 40, as referenced above, the plot in FIG. 4 represents oil level data 402 that have not been adjusted (e.g., raw oil level data). Therefore, oil consumption estimator 44 may adjust one or more data points of oil volume data 402 to account for tilt, including one or more points present in volatile regions of data, such as volatile regions 408, 410, 412, and 414, as indicated in FIG. 4.

Volatile regions, such as regions 408, 410, 412, and 414, may include data points that do not accurately represent the actual level of oil 16 in oil container 14 at the time that the corresponding measurement was taken due to the tilt of machine 12 and of oil container 14 at the relevant time. Additionally or alternatively, volatile regions may correspond to a status of internal combustion engine 30 at the time that the oil level measurement was taken, such as a cold-start condition that results in the generation of cold-start data. Oil consumption estimator 44 may be configured to adjust (e.g., by changing the value of the data point(s)), discard, or ignore points contained in volatile regions of oil volume data 402, such as one or more of regions 408, 410, 412, or 414. In some examples, one or more sensors of machine 12 (e.g., sensors 32 and/or 34) may determine when volatility is the result of vibration (e.g., vibration of machine 12 as rough material is traversed). Oil level data may be adjusted, discarded, or ignored when volatility occurs due to detected vibration, for example, in response to detection of vibration that has a predetermined magnitude and/or that occurs for at least a predetermined period of time.

Regions for oil level data adjustment, such as one or more volatile regions, may be identified based on tilt data for the corresponding time. In other examples, regions for adjustment may be identified by detecting volatility directly (e.g., based on values deviating from a local average or median). Oil consumption estimator 44 may adjust, or discard, every data point within a volatile region, or only a subset of the data points within the volatile region.

FIG. 5 illustrates oil level data that has been processed via a moving average analysis. As shown in FIG. 5, OCM 22 may be configured to track oil level data over an extended period of time. In the illustrated example, OCM 22 has monitored oil level data after five periods during which oil was consumed and/or lost and subsequently refilled.

OCM 22 may facilitate oil filling by generating oil consumption indicator 46 and/or determining a service interval (indicated, for example, by service indicator 48) to identify when oil should be replenished. In some aspects, oil level processor 42 may generate an indication to refill oil when the oil level reaches a fill threshold 512. A max fill threshold 520 may represent the maximum usable capacity of oil container 14. While one threshold 512 is shown in FIG. 5, as understood, different and/or additional thresholds may be used to provide warnings based on the operating status of internal combustion engine 30 (e.g., whether oil is cold or at operating temperature).

Oil volume data 502 in FIG. 5 includes a series of downward trending regions. Oil consumption estimator 44 may determine one or a plurality of oil consumption estimates that correspond to a downward-trending portion of oil volume data 502. Oil consumption estimator 44 may be further configured to monitor increases in the oil consumption estimates over time and determine when a current or previous oil consumption rate exceeds a predetermined threshold.

The plot in FIG. 5 represents oil level data that have not been adjusted based on tilt data from tilt estimator 40. Adjustments may be made to oil volume data 502 by adjusting individual oil level data points or a group of oil level data points, such as data point(s) in regions 504, 506, and 508. Adjustments may be made to region 504 by removing inaccurate (e.g., outlying) data points. Adjustments may be made to region 506 by ignoring or discarding data point(s) that are not indicative of oil consumption. In some aspects, oil consumption values (e.g., an oil consumption that corresponds to the slope of a line that fits data in region 508) may be modified by adjusting a group of data points.

FIG. 6 illustrates changes in oil consumption determined with oil consumption estimator 44. As shown in FIG. 6, oil consumption may initially decrease (e.g., during a break-in period) before increasing in a generally linear region 602. The rate of oil consumption may tend to increase in a linear manner between a first time T1 and a second time T2. At time T2, internal combustion engine 30 may be approaching a time for scheduled maintenance (e.g., engine overhaul). At or around time T2, the oil consumption of engine 30 may tend to increase in a non-linear manner.

Oil consumption estimator 44 may be configured to generate service indicator 48 indicating that an overhaul or other maintenance should be performed upon identifying a nonlinear region. Additionally or alternatively, indicator 48 may be generated when oil consumption estimator 44 detects that the oil consumption rate has reached a predetermined oil consumption rate 606.

Figure 7:
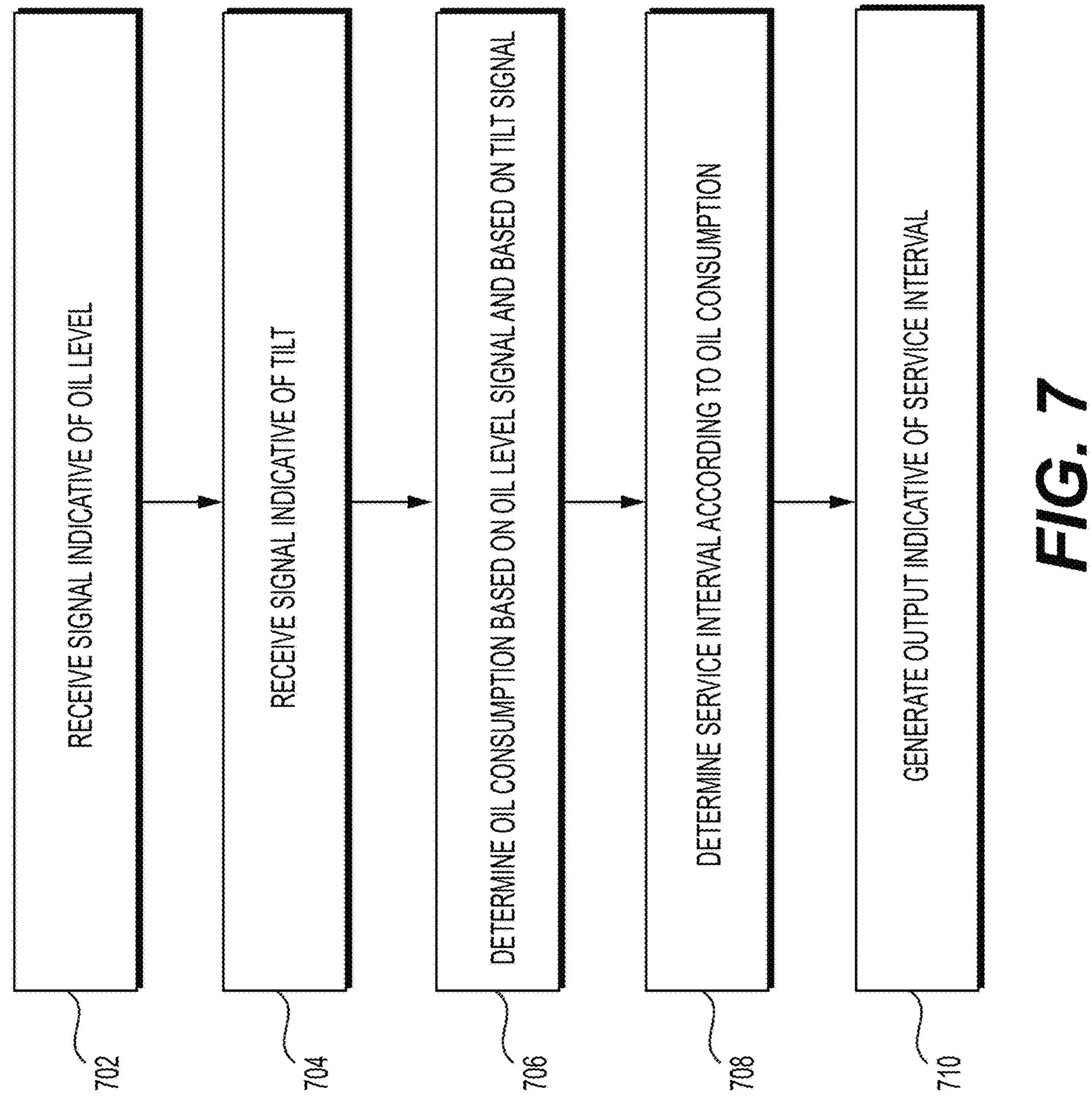
FIG. 7 is a flowchart illustrating an exemplary method for detecting engine oil consumption.

FIG. 7 is a flowchart illustrating an exemplary method for detecting engine oil consumption. In a step 702, OCM 22 may receive signals that indicate the level of oil 16 in oil container 14. Step 702 may include receiving signals from level sensor 18, as described above. A step 704 (step 704 being optional in at least some embodiments) may include receiving signals that indicate the tilt, or inclination, of oil container 14 with OCM 22. Tilt signals may be generated with one or more sensors, such as tilt sensor 24, suspension sensor 32, and/or force sensor 34.

A step 706 may include determining oil consumption based on the signals received in steps 702 and 704. For example, step 706 may including estimating oil consumption with oil consumption estimator 44 by adjusting one or more data points of oil level data. In some examples, the oil consumption may be adjusted directly. However, in at least some embodiments, tilt signals are not received and step 706 is performed without the use of a tilt signal.

A step 708 may include determining a service interval based on the oil consumption determined in step 706. The service interval may be a time when routine maintenance, unscheduled maintenance, repair, engine overhaul, etc., is due or is expected to be due. The determined service interval may be an adjustment to a previous service interval (e.g., a default value for a service interval). A step 710 may include generating an output based on the determined service interval. This service interval may be output as service indicator 48 and as described above.

The system and method may facilitate accurate determination of service intervals based on fluid level, and in particular, based on the level of lubricating oil for an internal combustion engine 30. The system and method may receive oil level data over time and use this oil level data to adjust service intervals, avoiding unnecessary service while ensuring that service is performed when necessary. Adjustments for tilt of a machine 12 may reduce or eliminate the impact of inaccurate oil level measurements. The use of an oil level sensor 18 that is sized to be inserted into an opening for an oil dipstick facilitates installation, reducing complexity and allowing installation of the system on a variety of different machines and machine types. Measurements with level sensor 18 may improve safety, automating the process for checking the level of engine oil and avoiding the need for manual inspection. In some aspects, the system includes one or more remote computing systems that receive data via data transmission device 26, allowing remote monitoring of oil level as well as remote monitoring of service intervals.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A system for detecting oil consumption, the system comprising:

an internal combustion engine;

an oil container configured to receive oil, oil in the oil container having an oil level;

an oil level sensor configured to output a signal indicative of the oil level;

a tilt sensor configured to output a signal indicative of an inclination of the oil container; and a controller configured to:

receive the signal indicative of the oil level from the oil level sensor, receive the signal indicative of the inclination of the oil container from the tilt sensor, determine an oil consumption rate of the internal combustion engine based on the signal from the oil level sensor and based on the signal from the tilt sensor when the signal from the tilt sensor indicates an amount of tilt that exceeds a threshold amount of tilt, and determine a service interval for the internal combustion engine according to the oil consumption rate.

2. The system of claim 1, wherein the tilt sensor is a single-axis level sensor, a two-axis level sensor, a three-axis level sensor, an inclinometer, or an inertial measurement unit (IMU).

3. The system of claim 1, wherein the tilt sensor is a suspension sensor or a force sensor.

4. The system of claim 1, wherein the controller is further configured to discard or ignore one or more oil level measurements based on a tilt sensed with the tilt sensor.

5. The system of claim 1, wherein the controller is further configured to adjust one or more oil level measurements based on a tilt sensed with the tilt sensor.

6. The system of claim 1, wherein the controller is further configured to adjust the determined oil consumption rate based on a tilt sensed with the tilt sensor.

7. The system of claim 1, wherein the internal combustion engine is supported on an industrial machine, the industrial machine being at a different location than the controller.

8. The system of claim 7, wherein the controller is further configured to monitor overhaul intervals for a plurality of industrial machines.

9. A system for detecting engine oil consumption, the system comprising:

an internal combustion engine;

an oil container configured to receive oil, the oil having an oil level;

an oil level sensor configured to output a signal indicative of the oil level;

a controller configured to:

receive the signal indicative of the oil level from the oil level sensor, determine an oil consumption rate based on the signal from the oil level sensor, determine a service interval for an overhaul of the internal combustion engine, and adjust the service interval for the overhaul of the internal combustion engine based on the oil consumption rate that was determined based on the signal from the oil level sensor.

10. The system of claim 9, wherein the controller is further configured to output an indication when the oil consumption rate exceeds a predetermined threshold consumption rate.

11. The system of claim 9, wherein the controller is further configured to output an indication associated with the overhaul of the internal combustion engine based on the oil consumption rate.

12. The system of claim 9, wherein the oil level sensor is configured to output the signal based on a capacitance measurement.

13. The system of claim 9, wherein the oil level sensor is inserted into a dipstick opening for the oil container.

14. The system of claim 9, wherein the controller is configured to adjust the service interval based on an oil consumption rate that was adjusted based on a detected tilt of the oil container.

15. A method for detecting engine oil consumption, comprising:

receiving a signal indicative of an oil level from an oil level sensor, the oil level sensor being connected to an oil container for storing oil for an internal combustion engine;

receiving a signal indicative of an inclination of the oil container from a tilt sensor;

determining an interval for performing an overhaul of the internal combustion engine, and adjusting the interval for performing the overhaul of the internal combustion engine based on the signal from the oil level sensor and based on the signal from the tilt sensor.

16. The method of claim 15, wherein adjusting the interval for performing the overhaul of the internal combustion engine includes discarding or ignoring one or more oil level measurements based on a tilt sensed with the tilt sensor.

17. The method of claim 15, wherein adjusting the interval for performing the overhaul of the internal combustion engine includes adjusting one or more oil level measurements based on a tilt sensed with the tilt sensor.

18. The method of claim 15, further including generating a notification based on the adjusted interval for performing the overhaul of the internal combustion engine.

19. The method of claim 15, wherein the tilt sensor is a single-axis level sensor, a two-axis level sensor, a three-axis level sensor, an inclinometer, an inertial measurement unit (IMU), a suspension sensor, or a force sensor.

20. The method of claim 15, further including adjusting oil level measurements based on a tilt sensed with the tilt sensor, the adjusted oil level measurements causing the adjustment to the interval for performing the overhaul of the internal combustion engine.

* * * * *